United States Patent
Dron

(10) Patent No.: US 7,267,301 B2
(45) Date of Patent: Sep. 11, 2007

(54) AIRCRAFT ENGINE WITH MEANS OF SUSPENSION FROM THE STRUCTURE OF AN AIRCRAFT

(75) Inventor: Sebastien Dron, Montrouge (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 11/116,260

(22) Filed: Apr. 28, 2005

(65) Prior Publication Data

US 2006/0000944 A1    Jan. 5, 2006

(30) Foreign Application Priority Data

May 4, 2004    (FR) .................................. 04 04781

(51) Int. Cl.
*B64D 27/00*    (2006.01)

(52) U.S. Cl. ...................................... 244/54

(58) Field of Classification Search ............. 244/53 R, 244/54, 55; 60/796, 797, 799
See application file for complete search history.

(56) References Cited

U.S. PATENT DOCUMENTS

| | | | |
|---|---|---|---|
| 4,326,682 A | | 4/1982 | Nightingale |
| 4,603,821 A | * | 8/1986 | White ......................... 244/54 |
| 5,303,880 A | * | 4/1994 | Cencula et al. ............... 244/54 |
| 5,351,930 A | * | 10/1994 | Gwinn et al. ............... 248/557 |
| 5,474,258 A | * | 12/1995 | Taylor et al. ................. 244/54 |
| 5,620,154 A | * | 4/1997 | Hey ............................. 244/54 |
| 5,649,417 A | * | 7/1997 | Hey ............................. 60/797 |
| 5,725,181 A | * | 3/1998 | Hey ............................. 244/54 |
| 5,860,623 A | * | 1/1999 | Dunstan et al. ............... 244/54 |
| 5,921,500 A | | 7/1999 | Ellis et al. |
| 5,927,644 A | * | 7/1999 | Ellis et al. .................... 244/54 |
| 6,170,252 B1 | * | 1/2001 | Van Duyn ................... 60/796 |
| 6,330,995 B1 | * | 12/2001 | Mangeiga et al. .......... 248/554 |
| 6,682,015 B2 | * | 1/2004 | Levert et al. ................. 244/54 |
| 6,843,449 B1 | * | 1/2005 | Manteiga et al. ............. 244/54 |
| 6,988,692 B2 | * | 1/2006 | Pasquer et al. ............... 244/54 |

FOREIGN PATENT DOCUMENTS

| | | |
|---|---|---|
| EP | 0 997 653 A2 | 5/2000 |
| FR | 2 799 432 | 4/2001 |

* cited by examiner

*Primary Examiner*—Robert P. Swiatek
*Assistant Examiner*—Stephen A Holzen
(74) *Attorney, Agent, or Firm*—Oblon, Spivak, McClelland, Maier & Neustadt, P.C.

(57) ABSTRACT

An aircraft engine includes a mounting attached to an aircraft structure and transmitting forces between an engine casing and the aircraft structure. The mounting includes a fail safe assembly with a safety clevis with two lugs and a tab arranged between the two lugs. Either the clevis or the tab is fixed to an element of the engine casing and the other tab or clevis is fixed to the structure. A safety hinge pin is perpendicular to the axis of the engine and passes through the tab and the clevis, the two lugs and the tab being parallel to the engine axis.

17 Claims, 1 Drawing Sheet

AIRCRAFT ENGINE WITH MEANS OF SUSPENSION FROM THE STRUCTURE OF AN AIRCRAFT

The invention relates to the mountings of aircraft engines, and particularly turbojets.

An engine comprises an inlet duct, a fan blade containment casing, an intermediate frame, a turbine frame and a nozzle or exhaust cone, in order from the upstream side to the downstream side along the air path passing through it.

In the case of fuselage mounting, an engine is usually attached to the aircraft by a front mounting and a rear mounting. The front mounting is fixed onto the intermediate frame of the engine, the rear mounting is fixed onto a mounting flange connected to the turbine frame through a series of links.

The engine comprises an outer fan duct that also performs the reverse thrust function between the reverser and the intermediate frame. This outer casing is then structural. In particular, the invention relates firstly to engines with an outer fan duct, and secondly to the forward and rear mountings of these engines. It also relates to the fail safe nature of this front mounting and more particularly to its thrust transmission means.

The engine is connected to a beam through the front mounting, itself fixed to an element of the aircraft reinforcement, usually a strut. For example, the intermediate frame may be fixed to the front mounting beam at three points, namely at the two ends (top and bottom) of the beam and at the median part, through three force transmitting elements. The elements for the beam ends are links, and the element for the median part is a groin or a central pin called a "spigot".

The front mounting of an engine attached laterally to the aft part of the fuselage transmits forces in four degrees: three degrees of translation, namely the Z vertical axis, the Y lateral axis and the X thrust axis, and one degree of rotation about the thrust axis X.

These force transmitting elements include links that are fixed at their ends to the engine casing and to the beam by clevises and that resist forces along their longitudinal direction only.

As for the front mounting, the rear mounting links are fixed at their ends to the ring and to the mounting beam through clevises that resist forces along their longitudinal direction. The rear mounting of an engine attached laterally to the fuselage transmits forces along the vertical axis Z and the lateral axis Y.

During normal operation, direct thrust forces are resisted by the front mounting and reverse thrust forces pass firstly in the direction from the aft end to the forward end through the outer fan duct and then through the intermediate frame and the front mounting, to finally reach the aircraft strut.

If one of the elements in the front mounting breaks, it is desirable if the fail safe rupture system continues to resist the thrust forces; it is also desirable that if an element on the rear mounting should break, the fail safe system should continue to resist forces depending on the degree associated with the broken element.

According to one characteristic of the invention, a turbojet aircraft engine comprising means of suspension from an aircraft with means of transmitting forces between the engine casing and the aircraft structure, and a fail safe means, is characterised by the fact that the said fail safe means includes an assembly of a safety clevis with two lugs and a tab or other equivalent means arranged between the two lugs, either the clevis or the tab being fixed to an element of the engine casing and the other tab or the clevis being fixed to the said structure, a safety hinge pin previously fixed perpendicular to the axis of the engine passing through the tab and the clevis, the two lugs of the clevis and the tab being parallel to the engine axis.

Preferably, the said hinge pin is installed with clearance in the tab.

Due to the invention, if the path of forces along the X axis, in other words the thrust direction, is lost, forces will be resisted through the previously fixed hinge pin.

According to another characteristic, the tab is installed with clearance between the two lugs of the clevis.

According to another characteristic, the invention more particularly relates to an aircraft engine with an outer fan duct, designed to be fixed to an aircraft fuselage, firstly through an intermediate frame and a front mounting, and secondly through a mounting flange connected to the intermediate frame through the outer thrust transmission casing, and a rear mounting, the mountings including force transmission means and fail safe means arranged to continuously resist forces if the force transmission means should fail. The engine is characterised by the fact that the rear mounting is arranged so that thrust forces will be resisted through the outer fan duct if the thrust transmission means of the front mounting fail.

Thus, the applicant proposes this invention to resist thrust forces on the front mounting if the thrust transmission means on this front mounting should fail.

The invention is remarkable by the fact that forces are transmitted through the outer fan duct, not only from the aft to the forward direction to carry the reverse forces of the reverser, but also in the direction from the front mounting to the rear mounting, in other words in the aft direction.

Preferably, the rear mounting of the engine according to the invention comprises an attachment beam fastening the mounting flange to the fuselage, comprising an assembly of a safety clevis with two lugs extending approximately along an axial plane of the engine, and a safety hinge pin designed to extend along the vertical direction passing through the central tab with a clearance, one being fixed to the mounting beam and the other to the mounting flange.

It is preferable if the clevis and the hinge pin are fixed to the mounting flange, an intermediate tab fixed to the beam extending between the two lugs of the clevis of the mounting flange.

During fail safe operation, if a failure occurs in the front mounting thrust transmission means, the clearance is absorbed and the thrust transmission passes through the rear mounting, the thrust is resisted through the intermediate frame, the outer fan duct, the mounting flange, the lugs of the safety clevis, the hinge pin and the rear mounting beam, before reaching the strut.

As an intermediate means, the invention also relates to the rear mounting for the engine according to the invention as such, with the characteristics already mentioned above.

There are many advantages: ease of manufacturing, low weight, ease of inspection of the primary force path and capability of providing a safety function if one of the conventional force transmission elements (the links) in the rear mounting should fail, which once again increases the mass and size.

The invention will be better understood after reading the following description of preferred embodiments of the engine and its rear mounting, with reference to the attached drawing on which:

Figure 1:
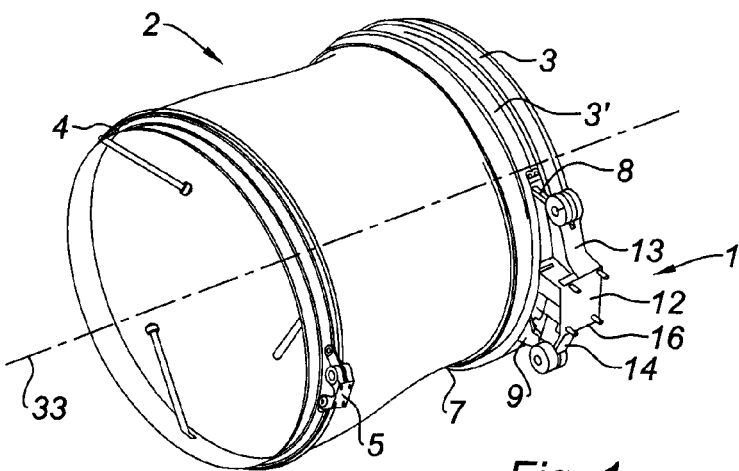
FIG. 1 shows a perspective view of the mountings and elements of the engine, to be suspended from the aircraft fuselage, and necessary for the mountings.
Figures 2, 3:
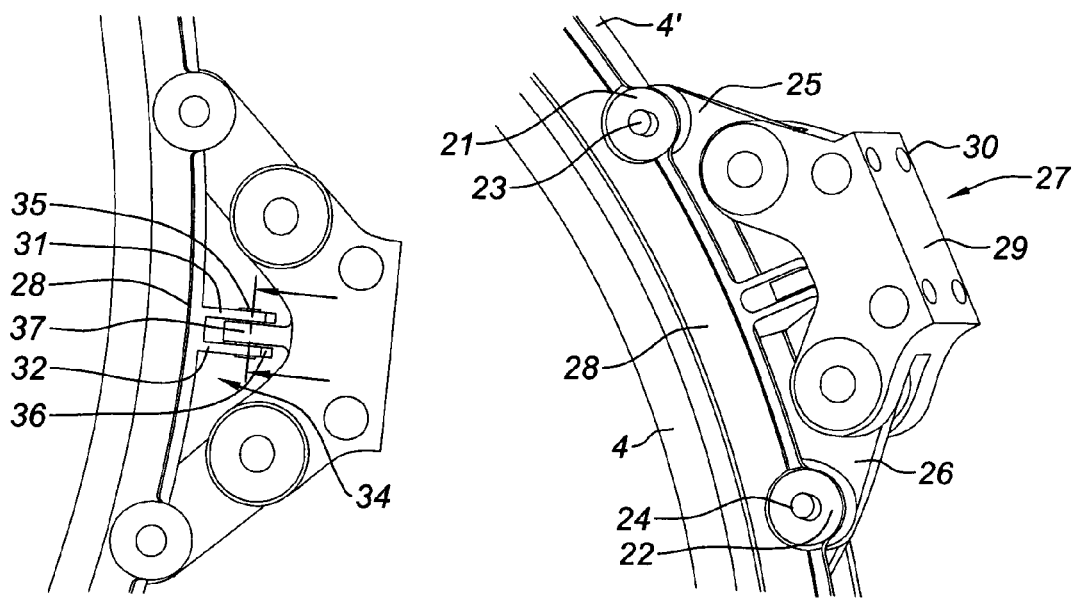
FIG. 2 is a front view of the rear mounting beam.
FIG. 3 is a perspective view of the rear mounting beam and the mounting flange of the engine suspended from the beam.
Figure 4:
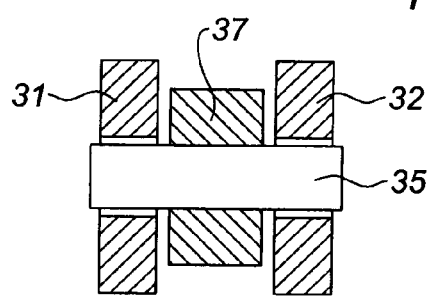
FIG. 4 shows the safety pin passing through the lugs of the clevis with a safety clearance.

The front mounting 1 and the rear mounting 5 that will now be described are designed to fix a turbojet 2 to an aircraft fuselage, usually the aft part of the fuselage, the turbojet 2 particularly comprising an intermediate frame 3 onto which the front mounting 1 is fixed, and a mounting flange 4 onto which the rear mounting 5 is fixed and that is connected to a turbine frame (not shown) through a series of links 6. The mounting flange 4 is also connected to the intermediate frame 3 through an outer fan duct 7 (transmitting direct or reverse thrust).

For the forward attachment of the jet, an upper female clevis 8 and a lower female clevis 9 are fixed onto an arc-shaped fitting 3' fixed to the intermediate frame; the intermediate frame has a radially projecting platform for holding a force transmitting element and a fail safe element for the front mounting 1, between the two devises in an area that could be qualified as being median.

The front mounting 1 comprises a beam 12, generally in an elongated and slightly curved trapezoidal shape, with two arms 13, 14 extending on each side of a median or central portion terminating at the smallest base of the trapezium in a laterally projecting plate 16 fastening it to a strut (not shown) of the aircraft fuselage structure.

The mounting beam 12 is attached to the strut through the plate 16 through shear pins and screws extending to the four corners of the plate and orthogonal to it.

The two free ends of the mounting beam arms 13, 14 are connected to the two clevis 8, 9 of the fitting 3' of the intermediate frame 3 through two force transmitting links installed free to turn in their clevises, and to the ends of the beam arms arranged also as clevises.

The platform of the median force transmitting and fail safe element in the front mounting holds a groin, or trunnion, or spindle; or spigot, not shown, connected through a ball joint, to transmit forces from the mounting beam 1.

The rear mounting 5 is globally similar to the front mounting 1.

Two cradles, the upper cradle 21 and the lower cradle 21 holding the force transmitting links 23, 24, are arranged on an arc-shaped fitting 4' fixed to the mounting flange 4, and the links are installed free to turn in these cradles at a first end, and in the ends of the two arms 25, 26 of the rear mounting beam 27 arranged in the form of a clevis at the second end.

The rear mounting beam 27 is generally trapezoidal in shape, and has two arms 25, 26 that extend on each side of a central portion 28 that terminates at the smallest base of the trapezium in a plate 29 fastening it to the strut forming part of the aircraft fuselage structure.

The rear mounting devices 5 of the thrust transmitting fail safety device in the front mounting 1 will now be described.

Two radial plates 31, 32 extend laterally projecting outside the fitting 4', approximately in the axial planes of the engine, in other words in the planes containing the thrust axis 33, and form the two lugs of a safety clevis 34. In their free end portion, the safety lugs are provided with a through reaming 36 holding a hinge pin 35 that passes vertically through it.

A tab 37 is suspended from the central portion of the beam 27 of the side opposite the plate 29. The hinge pin 35 is forced through the lugs 31 and 32. The tab is installed between the two lugs 31, 32 of the clevis 34, the hinge pin 35 passing through the reaming of the tab 37 with a safety clearance.

Naturally, one or the other of the arrangements mentioned above could have been reversed. Thus, the thrust transmitting links could have clevis shaped ends. The fail safe clevis 34 could have been fixed to the beam instead of being fixed to the mounting flange fitting, the tab 37 then being fixed to the fitting of the mounting flange.

During operation of the fail safe device, if the thrust transmission devices in the front mounting 1 fail, firstly the clearance between the hinge pin 35 and the reaming of the tab 37 is absorbed, and the thrust is then transmitted by the rear mounting 5, the thrust forces pass through the intermediate frame 3, the outer fan duct 7, the mounting flange 4 and its fitting 4', the hinge pin 35 and the rear mounting beam 27 before reaching the strut.

The invention claimed is:

1. An aircraft engine comprising a mounting attached to an aircraft structure and transmitting forces between an engine casing and the aircraft structure, said mounting comprising a fail safe assembly comprising a clevis with two lugs and a tab arranged between the two lugs, either the clevis or the tab being fixed to an element of the engine casing and the other tab or clevis being fixed to said structure, a safety hinge pin perpendicular to an engine thrust axis and passing through said two lugs and said tab with a safety clearance, the two lugs and the tab being parallel to the engine thrust axis.

2. An aircraft engine according to claim 1, wherein said safety clearance is between said safety hinge pin and the tab.

3. An aircraft engine according to claim 1, further comprising an outer fan duct designed to be fixed to an aircraft fuselage, firstly through an intermediate frame and a front mounting, and secondly through a mounting flange and a rear mounting, said mounting flange being connected to the intermediate frame through the outer fan duct, both front mounting and rear mounting transmitting forces between the engine casing and the aircraft structure, said front mounting comprising thrust transmission means, wherein the rear mounting comprises said fail safe assembly, thrust forces being transmitted through the outer fan duct and the rear mounting if the thrust transmission means of the front mounting fail.

4. An aircraft engine according to claim 3, wherein the rear mounting comprises an attachment beam fastening the mounting flange to the aircraft structure, with the two lugs of the clevis or the tab being fixed to the mounting beam and the other being fixed to the mounting flange.

5. An aircraft engine according to claim 4, wherein the clevis is fixed to the mounting flange and an intermediate tab is fixed to the beam.

6. An aircraft engine according to claim 4, wherein the rear mounting comprises a central portion with a plate to be attached to the aircraft structure and two arms that extend on each side of said central portion said two arms being attached to the mounting flange, said two lugs project outside the mounting flange in the axial plane of the engine, and said tab is suspended from the central portion, wherein, if a failure occurs in the thrust transmission means of the front mounting, the clearance is absorbed and thrust is transmitted through the rear mounting, the thrust forces pass through the intermediate frame, the outer fan duct, the mounting flange, the lugs of the safety clevis, the hinge pin and the beam of the rear mounting.

7. An aircraft engine according to claim 1, wherein said clevis is fixed to said element of the engine and said tab is fixed to said structure.

8. An aircraft engine according to claim 1, wherein said tab is fixed to said element of the engine and said clevis is fixed to said structure.

9. An aircraft engine according to claim 1, wherein said two lugs extend approximately along an axial plane of the engine.

10. An aircraft engine mounting for mounting an engine to an aircraft, said mounting comprising:
  a mounting beam configured to be coupled to a fuselage of said aircraft;
  two links, each configured to be coupled to said mounting beam at one end and configured to be coupled to an engine fitting at another end;
  two lugs extending approximately along an axial plane of the engine containing a thrust axis of said engine;
  a tab extending between said two lugs; and
  a pin configured to pass through said two lugs and said tab so as to leave a clearance between said pin and said tab and positioned perpendicularly to said thrust axis.

11. An aircraft engine mounting according to claim 10, wherein said mounting beam has a generally trapezoidal shape with two arms, each arm being coupled to one of said links.

12. An aircraft engine mounting according to claim 10, wherein said tab is attached to said mounting beam and said two lugs are attached to said engine fitting.

13. An aircraft engine mounting according to claim 10, wherein said two lugs are attached to said mounting beam and said tag is attached to said engine fitting.

14. An aircraft engine mounting according to claim 10, wherein said mounting beam comprises a plate configured to be coupled to said fuselage of said aircraft.

15. An aircraft engine mounting according to claim 10, wherein said two lugs are two radial plates extending laterally with respect to said engine fitting.

16. An aircraft engine mounting according to claim 10, wherein said mounting beam is coupled to said fuselage of said aircraft.

17. An aircraft engine mounting according to claim 10, wherein said two links are mounted onto said engine fitting.

* * * * *

UNITED STATES PATENT AND TRADEMARK OFFICE
CERTIFICATE OF CORRECTION

PATENT NO.       : 7,267,301 B2  
APPLICATION NO.  : 11/116260  
DATED            : September 11, 2007  
INVENTOR(S)      : Sebastien Dron Page 1 of 1

It is certified that error appears in the above-identified patent and that said Letters Patent is hereby corrected as shown below:

Column 3, line 25, change "devises" to --clevises--.

Signed and Sealed this

Twenty-ninth Day of April, 2008

JON W. DUDAS  
*Director of the United States Patent and Trademark Office*